June 5, 1951 M. OSCHWALD Re. 23,373

MECHANISM FOR CONVERTING ROTARY MOTION TO RECIPROCATORY MOTION

Original Filed April 1, 1947 2 Sheets-Sheet 1

Inventor
Max Oschwald
by Karlikichartis,
atty.

June 5, 1951 M. OSCHWALD Re. 23,373

MECHANISM FOR CONVERTING ROTARY MOTION TO RECIPROCATORY MOTION

Original Filed April 1, 1947 2 Sheets-Sheet 2

Inventor
Max Oschwald
by Karlstchaney
atty.

Reissued June 5, 1951

Re. 23,373

UNITED STATES PATENT OFFICE 23,373

MECHANISM FOR CONVERTING ROTARY MOTION TO RECIPROCATORY MOTION

Max Oschwald, Zuchwil, Switzerland, assignor to Scintilla A-G., Solothurn, Switzerland, a corporation of Switzerland Original No. 2,501,631, dated March 21, 1950, Serial No. 738,660, April 1, 1947. Application for reissue March 19, 1951, Serial No. 216,281. In Switzerland November 24, 1944

Section 1, Public Law 690, August 8, 1946
Patent expires November 24, 1964

4 Claims. (Cl. 74—50)

Matter enclosed in heavy brackets [ ] appears in the original patent but forms no part of this reissue specification; matter printed in italics indicates the additions made by reissue.

This invention relates to motor-driven tools designated to be moved by hand, and more especially to motor-driven reciprocating hand tools such as saws, cutters, files and the like, wherein the handle of the tool is formed by the motor housing.

It is an object of the invention to provide a light and handy tool permitting to operate on work pieces that are too bulky to be worked on a machine tool, such as large plywood panels or lumber boards, or which enables work to be performed in positions which are inaccessible for ordinary hand tools.

A further object of the invention is to provide a mechanism for converting the rotary motion of a motor into rectilinear reciprocatory motion, while eliminating the vibrations generated by its masses while they reciprocate at frequencies of at least 3000 power cycles per minute.

Figure 1:
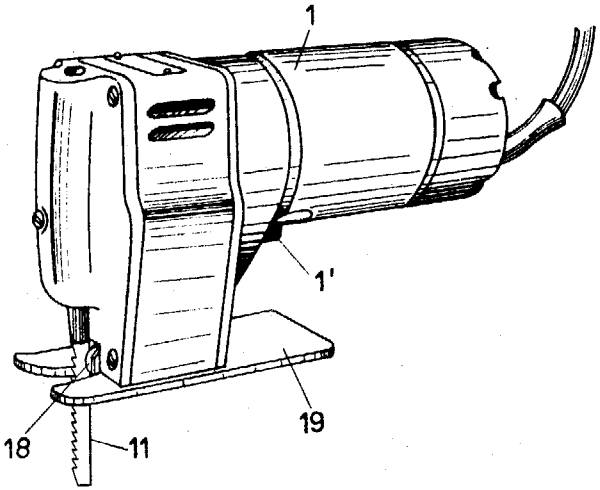
Figure 2:
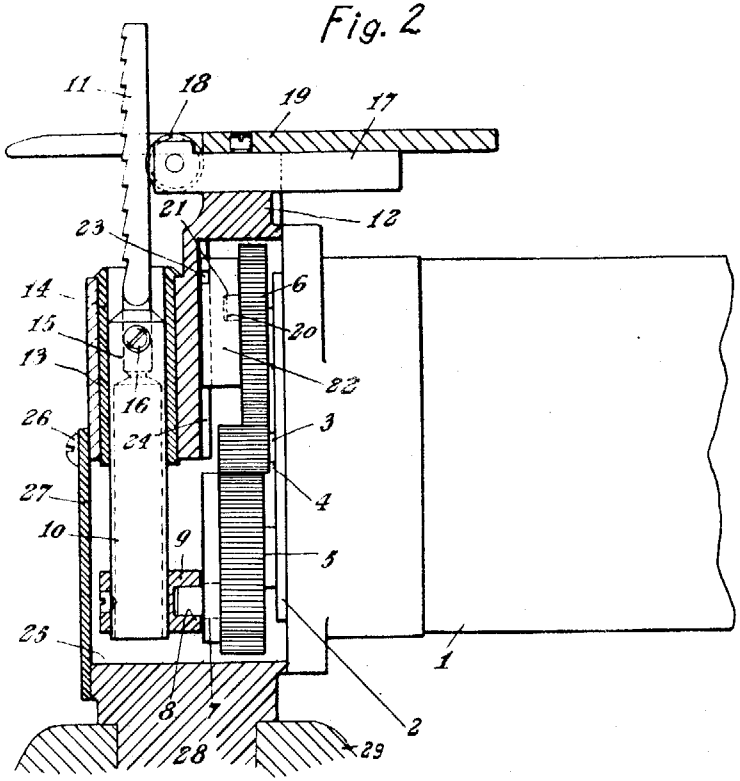

In order that the invention may be more readily understood, I will now describe two embodiments thereof which are illustrated diagrammatically by way of example in the accompanying drawings, in which:

Fig. 1 is a perspective view of the tool as a whole; while Fig. 2 is an axial sectional view, drawn to a larger scale, of a first embodiment of the invention.

Figure 3:
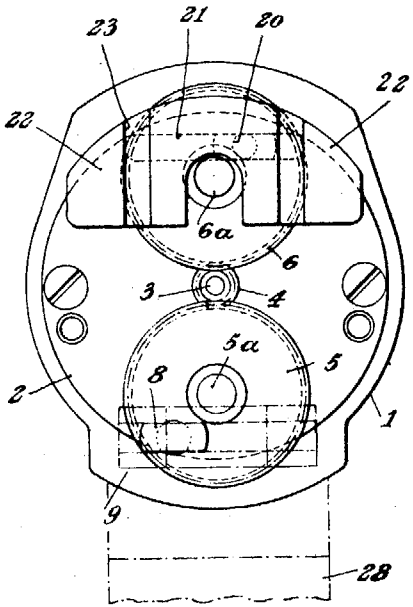

Fig. 3 being a front view wherein the cover with the reciprocating tool is removed to show the disposition of parts of the mechanism and some of the counterbalance elements.

Figure 4:
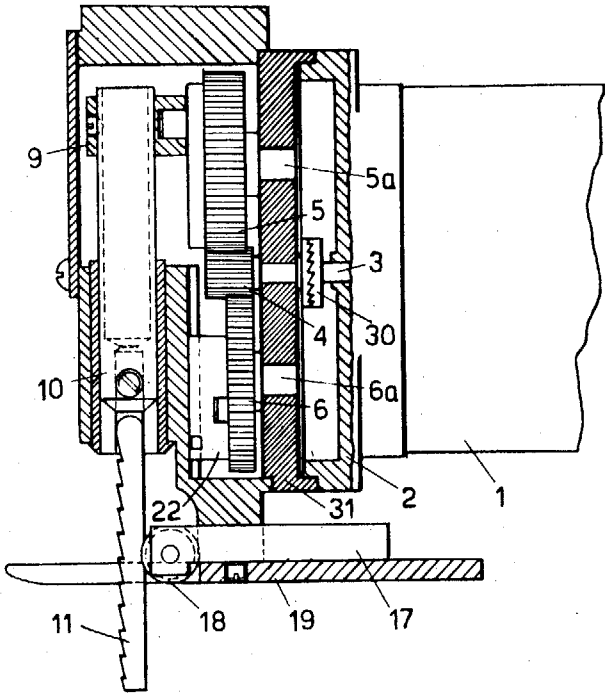

Fig. 4 is a part sectional view of a second embodiment.

Referring first to Figs. 1 to 3, the mechanism here illustrated shows a motor shaft fitted with a pinion which drives two gear wheels of equal size positioned in substantially the same plane and on a common diameter line. One gear wheel actuates a reciprocating device, which in turn reciprocates a tool, while the other gear wheel actuates a reciprocating device, which in turn reciprocates a counterbalance, the respective motions of both being such that the reciprocation of one of said devices is opposed to that of the other, thereby producing a uniform and vibrationless action of the tool.

The handle of the tool is formed by the housing 1 of an electric motor having a front bearing plate 2 through which projects the motor shaft 3, which is fitted with a pinion 4. On the front bearing plate 2 two gear wheels 5 and 6 are rotatably mounted on their fixed journals 5a and 6a respectively. Both of these gear wheels have an equal number of teeth. They are permanently in mesh with the pinion 4 on the motor shaft and are driven by it when the motor is operated. On one of the gear wheels 5 a crank pin 7 is eccentrically mounted. This crank pin 7 engages a slot 8 in a carrier 9, which is fixed to a reciprocatable tool arm 10 to which the tool 11 is secured.

The reciprocatable tool arm 10 is mounted in a guide 14 which is supported in the casing 13 of the gear-box 12 and has at one end a head 15 adapted to grip the tool 11 which is secured therein by a fastening screw 16. The tool 11, in the present case a saw, is supported by means of an adjustable guide 17 with a counter-pressure roller 18 bearing against the tool. It is obvious that the saw may be replaced by a cutter or by a file without departing from the scope of the invention.

On one side of the gear-box 12 a supporting plate or pedestal base 19 is arranged parallel to the motor axis. This plate is slotted lengthwise and through the slot the reciprocating tool projects at right angles to the base 19 which permits of the latter resting on the work and being used as in Fig. 1. On the opposite side of the gear-box a base member 28 may be provided by which may support the mechanism, as for example, in a vise 29. When so mounted, the reciprocating tool is directed vertically upwards and the pedestal base 19 serves as a work stage. The pedestal base may be adjustably mounted on the gear-box 12 and may be movable by means of joints (not shown), thus permitting the work to be presented to the tool at any angle.

Diametrically opposed to the aforementioned gear wheel 5 is the second gear wheel 6 mounted on its journal 6a. The latter gear wheel 6 is fitted with a crank pin 20 which engages with a transverse slot 21 in the counter-balance weight 22. This weight has on its other side, at right angles to the transverse slot, two guide slots 23 fitting guides 24 which are mounted or formed in the interior of the gear-box 12 so as to keep the balance weight in rectilinear direction.

When, by means of the motor, the pinion 4 on its shaft and the gear wheels 5 and 6 engaging this latter are set in motion, the reciprocatable arm 10 and balance weight 22 are reciprocated simultaneously and continuously in opposite directions. The load on the reciprocatable tool arm 10 and the tool 11 is thus counterbalanced and vibrations set up in the mechanism, even at high speeds, are avoided. Work of every description, of which the invention is capable, can be performed safely and accurately.

In place of the crank and slot mechanism described above, reciprocation of the tool arm 10 and of the balance weight 22 may be accomplished by rods connected to crank pins on the gear wheels 5 and 6 by spigots fixed to the reciprocating parts and riding in eccentric grooves out into the face of the gear wheels.

For greasing the moving parts in the gear-box 12, an aperture 25 is provided therein with a copper plate 27 rockably fastened to the gear box by a screw 26.

The embodiment shown in Fig. 4 provides for the motor being able to serve other purposes besides the one described, for instance, to drive a small compressor (not shown) or some other suitable implement secured to its front end. In order to facilitate conversion, an intermediate bearing plate 31 supporting the gearing components, and a disengaging clutch 30 on the motor shaft between the intermediate plate 31 and the front bearing plate 2, may be incorporated in the mechanism. The said intermediate bearing plate 31 may be fastened to the motor housing by means of screws or in some other manner.

I wish it to be understood that I do not desire to be limited to the details of construction shown and described, for obvious modifications will occur to a person skilled in the art.

I claim:

1. A mechanism for converting high speed rotary motion of a prime mover into high speed reciprocating motion of a driven member and a counter-balancing mass comprising, a first power transmitting member mounted for rotation about an axis parallel to said prime mover for driving said driven member, a second power transmitting member mounted for rotation about a second axis parallel to said prime mover for driving said mass, said power transmitting members being positioned in substantially the same plane and spaced from one another, means positioned between said power transmitting members for driving said power transmitting members from said prime mover, guiding means for said driven member positioned in proximity to said second power transmitting member and spaced therefrom, said driven member being slidably supported by said guiding means for reciprocating movement in a plane substantially parallel to the plane of said power transmitting members and extending from a point in the proximity of and opposite to said second power transmitting member to a point in proximity to said first power transmitting member, means supporting said mass for reciprocating movement intermediate said driven member and said second power transmitting means, means on each of said driven member and said counter-balancing mass extending transversely of said axes and of the direction of movement of said mass and said driven member, and a crank member on each of said power transmitting members operatively engaging said transversely extending means so as to move each of said counter-balancing mass and driven member simultaneously.

2. A mechanism for converting high speed rotary motion of a prime mover into high speed reciprocating motion of a driven member and a counter-balancing mass comprising, a first power transmitting member mounted for rotation about an axis parallel to said prime mover for driving said driven member, a second power transmitting member mounted for rotation about a second axis parallel to said prime mover for driving said mass, said power transmitting members being positioned in substantially the same plane and spaced from one another, means positioned between said power transmitting members for driving said power transmitting members from said prime mover, guiding means for said driven member, said guiding means including a sleeve opposite to and spaced from said second power transmitting member, said driven member being slidably supported in said sleeve for reciprocating movement in a plane substantially parallel to the plane of said power transmitting members and extending from within said sleeve to a point in proximity to said first power transmitting member, means supporting said mass for reciprocating movement intermediate said driven member and said second power transmitting means, means on each of said driven member and said counter-balancing mass extending transversely of said axes and of the direction of movement of said mass and said driven member, and a crank member on each of said power transmitting members operatively engaging said transversely extending means so as to move each of said counter-balancing mass and driven member simultaneously.

*3. A mechanism for converting high speed rotary motion of a prime mover into high speed reciprocating motion of a driven member and a counter-balancing mass comprising, two power transmitting members mounted for rotation about two axes parallel to said prime mover for driving said driven member and said mass, said power transmitting members being positioned in substantially the same plane and spaced from one another, means positioned between said power transmitting members for driving said power transmitting members from said prime mover, guiding means for said driven member positioned in proximity to the plane of said power transmitting members and spaced therefrom, said driven member being slideably supported by said guiding means for reciprocating movement in a plane substantially parallel to the plane of said power transmitting members, means supporting said mass for reciprocatory movement intermediate said driven member and the plane of said power transmitting members, means on each of said driven member and said counter-balancing mass extending transversely of said axes and of the direction of movement of said mass and said driven member, and a crank member on each of said power transmitting members operatively engaging said transversely extending means so as to move each of said counter-balancing mass and driven member simultaneously.*

*4. A mechanism for converting high speed rotary motion of a prime mover into high speed reciprocating motion of a driven member and a counter-balancing mass comprising, two power transmitting members mounted for rotation about two axes parallel to said prime mover for driving said driven member and said mass, said power transmitting members being positioned in substantially the same plane and spaced from one another, means positioned between said power transmitting members for driving said power*

*transmitting members from said prime mover, guiding means for said driven member, said guiding means including a sleeve opposite to and spaced from the plane of said power transmitting members, said driven member being slideably supported in said sleeve for reciprocating movement in a plane substantially parallel to the plane of said power transmitting members, means supporting said mass for reciprocatory movement intermediate said driven member and the plane of said power transmitting members, means on each of said driven member and said counter-balancing mass extending transversely of said axes and of the direction of movement of said mass and said driven member, and a crank member on each of said power transmitting members operatively engaging said transversely extending means so as to move each of said counter-balancing mass and driven member simultaneously.*

MAX OSCHWALD.

REFERENCES CITED

The following references are of record in the file of this patent or the original patent:

UNITED STATES PATENTS

| Number | Name | Date |
|---|---|---|
| 200,306 | Irick | Feb. 12, 1878 |
| 702,371 | Meyer | June 10, 1902 |
| 812,507 | Ludewick | Feb. 13, 1906 |
| 841,325 | King | Jan. 15, 1907 |
| 1,126,899 | Specht et al. | Feb. 2, 1915 |
| 1,382,821 | Coates | June 28, 1921 |
| 1,542,127 | Hastings | June 16, 1925 |
| 1,620,374 | Maloney | Mar. 8, 1927 |
| 1,643,721 | Meyer | Sept. 27, 1927 |
| 1,648,008 | Selby et al. | Nov. 8, 1927 |
| 1,661,217 | Farrell | Mar. 6, 1928 |
| 1,700,114 | Thompson | Jan. 22, 1929 |
| 1,700,115 | Thompson | Jan. 22, 1929 |
| 1,789,804 | Broillet | Jan. 20, 1931 |
| 1,868,507 | Roos | July 26, 1932 |
| 2,138,862 | Johnston | Dec. 6, 1938 |
| 2,281,641 | Toop | May 5, 1942 |
| 2,282,728 | Kern | May 12, 1942 |
| 2,328,613 | Burleigh | Sept. 7, 1943 |
| 2,345,383 | Curtis | Mar. 28, 1944 |
| 2,428,924 | Albertson | Oct. 14, 1947 |